United States Patent
Swales et al.

(10) Patent No.: US 7,338,702 B2
(45) Date of Patent: Mar. 4, 2008

(54) NON-WOVEN GLASS MAT WITH DISSOLVABLE BINDER SYSTEM FOR FIBER-REINFORCED GYPSUM BOARD

(75) Inventors: Timothy G. Swales, Aurora, CO (US); Philippe M. Scheerlinck, Lakewood, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 10/832,500

(22) Filed: Apr. 27, 2004

(65) Prior Publication Data

US 2005/0238863 A1    Oct. 27, 2005

(51) Int. Cl.
*B32B 17/12* (2006.01)
*B32B 13/10* (2006.01)

(52) U.S. Cl. .............. 428/294.1; 428/294.7; 442/58; 442/386

(58) Field of Classification Search ......... 428/219, 428/303, 317, 297, 535, 538, 294.1, 294.7; 106/778, 677, 678; 442/58, 386, 180, 42, 442/256, 279
See application file for complete search history.

(56) References Cited

U.S. PATENT DOCUMENTS

| | | | | |
|---|---|---|---|---|
| 1,439,954 A | * | 12/1922 | Emerson ............... | 428/140 |
| 3,944,698 A | * | 3/1976 | Dierks et al. ......... | 428/219 |
| 3,948,673 A | * | 4/1976 | Chase et al. .......... | 106/711 |
| 4,810,569 A | * | 3/1989 | Lehnert et al. ........ | 442/386 |
| 5,110,073 A | * | 5/1992 | Schoenky ............. | 248/49 |
| 5,110,873 A | * | 5/1992 | Kono et al. ........... | 525/305 |
| 5,135,805 A | * | 8/1992 | Sellers et al. ......... | 442/386 |
| 5,397,631 A | * | 3/1995 | Green et al. .......... | 428/219 |
| 6,103,352 A | * | 8/2000 | Takahashi ............ | 428/195.1 |
| 6,171,388 B1 | * | 1/2001 | Jobbins ................ | 106/778 |
| 6,182,407 B1 | * | 2/2001 | Turpin et al. ......... | 52/232 |
| 6,737,156 B2 | * | 5/2004 | Koval et al. .......... | 428/294.7 |
| 6,808,793 B2 | * | 10/2004 | Randall et al. ....... | 428/219 |
| 7,138,346 B2 | * | 11/2006 | Bush et al. ........... | 442/180 |

* cited by examiner

*Primary Examiner*—N. Edwards
(74) *Attorney, Agent, or Firm*—Robert D. Touslee

(57) ABSTRACT

A gypsum board having glass fiber reinforcement. The glass fiber has sizing promoting bonding with a gypsum matrix. The glass fibers are added to the gypsum matrix cia a non-woven glass fiber mat bonded initially with a dissolvable or reversible binder to maintain the three dimensional architecture of the non-woven glass fiber mat during handling and insertion into a cast wet gypsum slurry forming a gypsum board. Upon insertion in the wet gypsum slurry, the dissolvable bond between the glass fibers in the non-woven glass fiber mat dissolves and allows the sizing coating on the glass fibers to make intimate contact with the gypsum matrix. In case of the reversible bond, the bond adhesive hydrolyzes during the gypsum board drying cycle providing intimate contact between the sizing coated glass fibers and the gypsum matrix. The non-woven glass fiber mats bonded to the gypsum matrix provides improved strength and flexure resistance of the gypsum board.

10 Claims, 1 Drawing Sheet

NON-WOVEN GLASS MAT WITH DISSOLVABLE BINDER SYSTEM FOR FIBER-REINFORCED GYPSUM BOARD

BACKGROUND OF THE INVENTION

1. Field of the Invention

The present invention relates to glass fiber non-woven glass fiber mat; and more particularly to a non-woven glass fiber mat having a pre-selected architecture, which is placed within cast gypsum slurry during the manufacture of a gypsum board in the form of a glass mat into which the binder dissolves shortly after incorporation of the glass mat in the gypsum slurry, to thereby provide structured and intimate reinforcing contact between the gypsum matrix and the reinforcing glass fibers.

2. Description of the Prior Art

Many patents address issues related to the use of glass fibers in various matrix compositions in composites. Treatment of glass fibers to improve bonding properties with the matrix has been addressed. None of these patents, however, relate to a method of bonding a non woven glass fiber mat using dissolvable binders which is handled and incorporated into a gypsum matrix as a strengthening reinforcement.

U.S. Pat. No. 4,233,353 to Bondoc et al. discloses high-strength built-up roofing using improved glass fiber mats. The high-strength built-up roofing (BUR) membranes are made using improved glass fiber mat structures having unusual tear resistance in place of organic felts. The glass fiber mats are constructed from two fibrous components, namely, individual filaments, which provide the uniform denseness required for impregnation of saturant asphalt in the interstices of the mat, and extended fiber elements formed by longitudinal extension and connection of fibers from bundles of glass fibers in a wet-laid process, which furnish tear resistance and tensile strength to the BUR membranes and systems. The extended fiber elements are characterized structurally by being comprised of a plurality of longitudinally connected fibers formed from an extension of bundles of fibers, which slide apart during the process of dispersion of the fiber bundles. Thus the fiber elements have an exaggerated length and a non-uniform diameter, being greatest in the mid-section, where the connection of fibers is the strongest, and tapered towards its ends. Generally, the extended fiber elements predominate by weight over the individual filaments; preferably, in a ratio of about 60% to 40% by weight of the total fibrous material in the mat. The resultant BUR membranes have exceedingly high strengths compared with commercially available products of similar construction, and can be manufactured by a very economical process. The '353 patent discloses a high-strength built-up roofing membrane and system using improved glass fiber mats. These glass fiber mats are manufactured in a wet-laid process, and are comprised of two fibrous components, namely, a plurality of individual glass filaments fibers and extended glass fiber elements. The glass fibers are bound together by commercial binders, such as urea formaldehyde or urea formaldehyde resins. The glass fiber mat can further be impregnated with saturated asphalt to form asphalt-roofing sheets via a built up roofing membrane (BUR membrane). Multiple layers of the roofing sheets are bonded together using an asphalt binder to produce a built up roofing system. The binder system is permanently bonded and is not dissolved in the asphalt. This is not a gypsum-based system.

U.S. Pat. No. 4,506,060 to White, Sr. et al. discloses a water-soluble one-component polymeric resin binder system for fiberglass mats. The water-soluble one-component fiberglass mat binder composition comprises a urea-formaldehyde resin and polyvinyl acetate polymers and/or vinyl acrylic-polyvinyl acetate copolymers are used in the manufacture of asphalt shingles. The shingles are formed by the asphalt coating of a fiberglass mat in which the glass fiber mat has been coated with the binder composition and cured to bond the glass fibers together in the mat structure. This is an asphalt roofing shingle with glass fiber reinforcement and is not a gypsum board. The binder is retained in the asphalt matrix and is not dissolved.

U.S. Pat. No. 4,783,942 to Nunley et al. discloses a composite roof deck assembly wherein a polymeric membrane is adhered to a fiberglass mat surface further adhered to an underlying gypsum board. The polymeric membrane is comprised of a vulcanized synthetic rubber, preferably vulcanized ethylene propylene diene terpolymer (EPDM). A composite roof/roof deck assembly and method of installation wherein a roof covering of polymeric sheet material is adhered to an underlying gypsum board roof substrate with a water based polymeric adhesive is disclosed. The gypsum board has a porous fibrous glass matte facing to enhance bonding between the water-based adhesive and the gypsum board. A gypsum board with fiberglass surfaces instead of paper is used to attach an EPDM vulcanized sheet of rubber using water-soluble adhesive. Such disclosure concerning a roof construction over a corrugated steel sheet does not suggest a paper-faced gypsum board reinforced with non-woven glass fiber mat embedded within the board. Moreover, the '942 patent discloses that the fiberglass mats are formed by a permanent binder resin, bound on the entire upper and lower surfaces of the gypsum board.

U.S. Pat. No. 4,810,569 to Lehnert et al. discloses a fibrous mat-faced gypsum board included in an exterior finishing system for a building. The board is designed for an exterior insulation system and includes a fibrous mat-faced gypsum board in which the set gypsum core is water resistant. The set gypsum core is sandwiched between two sheets of porous glass mat, with the outer surface of at least one of the mats being substantially free of set gypsum. The '569 patent discloses the means for preparing the board, including the control of the viscosity of the aqueous gypsum slurry from which the set gypsum core of the board is formed. The '569 patent also discloses the use of a fibrous mat-faced gypsum board as the shaft liner panel in a shaft wall assembly. The surfaces of the gypsum board are covered with a fibrous mat and the gypsum only partially penetrates the fibrous mat, leaving the top and bottom surface of the board with a gypsum free rough surface. This rough surface provides superior bonding to insulation. The fibers bonded to the gypsum board provide improved strength. The fibrous mat is adhered to the top and bottom surfaces of the gypsum board, and there is not a non-woven fibrous mat present within the gypsum board. The surfaces of the '569 patent's article are not smooth and cannot be easily painted or wall papered.

U.S. Pat. Nos. 4,879,173, 5,342,680, 5,718,785 and 5,981,406 to Randall disclose a gypsum board faced with a fibrous mat. Specifically, the fibrous mat comprises glass filaments held together with a reinforcing resinous binder and adhesively bound to the face of a gypsum board. The gypsum board has a set gypsum core with a non-woven glass fiber mat having a predetermined thickness adhered to at least one of the surfaces of the gypsum board. The glass fibers in the mat are bound together by an adhesive and a reinforcing resinous binder extending partway through the thickness into the interstices of the mat. Remarkably, it has been found that the improved properties which are possessed by the board can be achieved by the use of amounts of a reinforcing resinous binder which do not significantly change the drying characteristics of the board. The glass mat with reinforcing resinous binder is placed on one surface of the gypsum slurry with the mat partially penetrating into the slurry. Additional resin is applied over the mat to penetrate the interstices in the mat, and is cured to form a reinforced gypsum board. The glass mat reinforcement is located on the top surface of the gypsum board and contains a resin, which partially fills the mat. The gypsum also fills the mat partially. The glass mat is not within the gypsum board.

U.S. Pat. No. 5,371,989 to Lehnert et al. discloses a use of fibrous mat-faced gypsum board in exterior finishing systems for buildings and shaft wall assemblies. Specifically, the disclosure provides an improved structural support element comprising a fibrous mat-faced gypsum support surface for use in an exterior finishing system, including exterior insulating systems, for buildings. The '989 patent is a CIP of U.S. Pat. No. 4,810,569 to Lehnert et al., referenced hereinabove. Like the '569 patent, the '989 patent discloses a fibrous mat-faced gypsum board, wherein the set gypsum core thereof is water resistant, and wherein the set gypsum core is sandwiched between two sheets of porous glass mat. In summary, the '569 patent and the '989 patent disclose adhesion of the glass mats to the top and bottom surfaces of the gypsum board. Clearly these two patents do not disclose use of a non-woven fibrous mat within the gypsum board. As a result, the gypsum boards produced in accordance with the '569 and '989 patent teachings lack a smooth surface; and therefore cannot be readily painted or wall papered.

U.S. Pat. No. 5,401,588 to Garvey et al. discloses a gypsum microfiber sheet material. The novel composition comprises a paper-like sheet material or a non-woven mat, which contains water-insoluble gypsum anhydrite microfibers and a cellulosic binder, such as cellulose fibers, optionally with glass fibers, which has surprising fire-retardant properties. Typical paper processing methods or wet process mat techniques are utilized in preparing this material. The flexible gypsum microfiber sheet or mat may be used as microfiber insulation, particularly in a fire retardant barrier. The gypsum microfiber comprises needles of anhydrite gypsum. It is water insoluble unlike set calcined gypsum of the gypsum board. The gypsum microfiber material is a sheet-like, fire retardant material, and not a reinforced gypsum board.

U.S. Pat. No. 5,772,846 to Jaffee discloses a non-woven glass fiber mat for facing gypsum board and method of making the same. The '846 patent discloses a new thermoformable non-woven fibrous mat having properties particularly suited for a facer on insulating gypsum board and the method of making the mat. The mat can also be pleated or thermoformed to produce filter elements and preforms for producing a wide range of fiber reinforced composites and laminates. The disclosed mat preferably contains a major portion of glass fibers and a minor portion of polyester fibers bound together with up to 35 weight percent of a cross linked vinyl chloride acrylate copolymer binder having a glass transition temperature as high as about 113° F., and preferably about 97° F. The binder also optionally contains about 3 to 10 weight percent stearylated melamine. The '846 patent sets forth a non-woven fibrous mat for use as a facer on gypsum insulating board. The non-woven fibrous mat allows for improvements in gypsum boards by way of improving their handling characteristics, flame resistance, flexibility, and particle irritation (by producing less irritating dust). The textile glass fiber mat is formed with latex composition containing a mixture of cross-linked vinyl chloride acrylate copolymer with a small amount of stearylated melamine. The glass fiber mat has all the properties desired for use as a facer for the insulating gypsum board, especially handle-ability and high strength, and the glass fiber mat can be pleated to form an accordion shaped filter element. The '846 patent does not describe a gypsum board that is reinforced with non-woven glass fiber mats that are within the interior of the gypsum board.

U.S. Pat. No. 6,001,496 to O'Haver-Smith discloses a mat-faced gypsum board and method of manufacturing the same. The disclosed mat-faced gypsum board with a gypsum-based core is formed from a gypsum slurry compressed through an extrusion ratio of at least about 3:1 wherein the fibrous mat is facing on at least one side of the board. The mat has a weight per unit surface area of greater than about 1.85 lb/100 sq. ft. The gypsum-based core has a substantially uniform thickness of no greater than about 0.375 inch and the fibrous mat consists essentially of inorganic fibers having a diameter of greater than about 10 microns to less than about 15 microns. The process aspects of process comprises (a) providing a porous fibrous mat having a weight per unit surface area of greater than about 1.85 lb per 100 sq. ft. and comprising in major proportion inorganic fibers having a diameter of less than about 15 microns; (b) bringing a gypsum slurry into contact with the mat; and (c) exerting a compressive force on the slurry by exposing the mat/slurry combination to an extrusion ratio of at least about 3:1. In the '496 patent disclosure, the mat is laid over on each side of the gypsum slurry forming the gypsum board and is compressed to bond the gypsum matrix with the placed mat. The gypsum slurry at least partially is filled within the mat leaving a highly textured surface for bonding to insulation etc. The mat is outside the gypsum core and is not contained within the gypsum core.

U.S. Pat. No. 6,524,679 to Hauber et al. discloses a glass reinforced gypsum board. A multilayer gypsum board having face sheets comprising inorganic fiber, preferably randomly oriented glass fiber, which have been completely impregnated with a gypsum slurry so as to penetrate through the random interstices between the inorganic fibers and to thereby coat the board surfaces with gypsum slurry is disclosed. The multilayer gypsum board may have a polymeric compound added to unset the gypsum. The compound may comprise any of the following: polyacrylamide, polymethylacrylamide, polyvinyidene chloride (PVDC), polyamide, poly (hexamethylene adipamide), polyvinylchloride (PVC), polyethylene, cellulose acetate, polyisobutylene, polycarbonate, polypropylene, polystyrene, polychloroprene, styrene, butadiene, natural rubber, poly(2,6 dimethyl pentene oxide), poly(4-methyl-1-pentene) and polydimethyl siloxane. The multilayer gypsum board may comprise a first layer of a mixture of set gypsum having an outer surface and the polymeric compound additive entrained within the set gypsum and being impregnated in a thin sheet of randomly aligned inorganic fibers so as to essentially encase the core gypsum within two facing layers having a combination set gypsum and polymeric compound. A multilayer gypsum board is formed by incorporating glass fibers together with polymeric additives to bury the fibers within the top and bottom surfaces of the board. The edges may be reinforced and continued on to a portion of the top surface. The inorganic glass fibers are individually incorporated on the top and bottom of the cast gypsum but not within the cast gypsum board and the gypsum slurry enriched with polymers. Also, a non-woven glass fiber mat is not used.

U.S. patent application US 2002/0151240 to Smith et al. discloses a composite facer for wallboards. The composite facer material has applications for use with cementations wallboards, wherein the composite facer is embedded in a top and bottom face thereof. The composite facer material comprises two layers. The first layer is a carded polyester non-woven mat, which is bonded to a second layer comprising a tri-directional laid scrim fabric reinforcement layer made of continuous glass fibers. The two layers are preferably bonded together using an acrylic adhesive, which offers superior adhesion between the layers as well as superior adhesion between the composite facing material and the cementitious core. The '240 patent application discloses a composite facer for wallboards. It includes a reinforcement, which is made as two layers. The first layer is a corded non-woven polyester mat and the second layer is a scrim cloth of continuous glass fibers, bonded together using acrylic polymer adhesive. The composite reinforcement is placed on the top and bottom of the gypsum slurry forming a gypsum board, so that the composite mats are slightly below the surface of the board. The rigidity of the composite reinforcement may break the fibers when flexed and fed through gypsum board manufacturing machinery. The reinforcing fibers are on the top and bottom surfaces, not within the cast gypsum board.

U.S. patent application US 2003/0134079 to Bush et al. discloses a method and composition for coating mat and articles produced therewith. The coated glass mat comprises a glass mat substrate having non-woven glass fibers and a coating, which essentially uniformly penetrates the glass mat substrate to desired fractional thickness of the coated glass mat. The coating is preferably a coating blend comprised of water, latex binder, inorganic pigment, and inorganic binder. The coating imparts a tensile strength to the coated glass mat, which on average is at least 1.33 times greater than the tensile strength of the glass mat substrate without the coating. Moreover, a non-coated thickness of the coated glass mat is sufficiently thick for bonding purposes with, e.g., gypsum slurry or other core materials such as thermoplastic or thermosetting plastics. The coating has porosity which provides the coated glass mat with porosity sufficient to allow water vapor to escape from gypsum slurry when heated. A glass mat with non-woven glass fibers is coated with water, latex binder, inorganic pigment, and inorganic binder using a larger wrap kiss coater. The binder penetrates 25% to 75% of the thickness of the mat leaving a rough uncoated free surface. The mat may be placed on gypsum slurry, thereby reinforcing the gypsum board. The non-woven glass mat is bonded with water, latex binder, inorganic pigment, and inorganic binder and the binder is not water soluble or reversible. The glass fiber mat is placed on top of gypsum slurry forming the gypsum board and is not incorporated within the gypsum board.

U.S. patent application US 2003/0203191 to Randall et al. discloses a mat-faced gypsum board. A moisture-tolerant structural panel comprising a gypsum board further comprising a set gypsum core sandwiched between and faced with mats of glass fibers, wherein a free surface of one of the mats is coated with a combination of a mineral pigment, an inorganic adhesive binder and a polymer latex adhesive binder applied to the mat surface as an aqueous coating composition and subjected to drying and setting, covering the mat to the extent that substantially none of the fibers of the mat protrude from the coating is disclosed. The improved gypsum-based structural panel can be used effectively as a tile backer and in other applications where water and humid conditions are commonly encountered. The binder coating comprises a mineral pigment (pigmented filler material), an inorganic binder and a latex polymer binder. The first binder is a polymer latex adhesive and the second binder is an inorganic adhesive comprising an inorganic compound such as calcium oxide, calcium silicate, calcium sulfate, magnesium oxychloride, magnesium oxysulfate, or aluminum hydroxide. The '191 patent application discloses a mat-faced gypsum board. Two glass fiber mats are bonded to the surfaces of a gypsum board during its manufacture and a water proof coating composing a first adhesive of latex formulation and a second inorganic adhesive is applied to at least one surface of the gypsum board to provide moisture resistance. The glass fiber mat is not non-woven. Moreover, it is not indicated how the glass fibers are bonded. The mats are placed on both surfaces of the gypsum board, but no mat is present within the gypsum board. Furthermore, a moisture resistant adhesive is applied to the mat surface.

U.S. patent application US 2003/0232182 to Bruce et al. discloses a gypsum board having improved flexibility, toughness, abuse resistance, water resistance and fire resistance. The gypsum board has a non-woven liner and gypsum core with a high work to break, resulting in a gypsum board product that has a high resistance to abuse in use. The gypsum board is also more flexible and more resistant to water and fire than paper-lined gypsum board, and does not contain nutrients that support mold growth. The gypsum board with a gypsum core held between two sheets of porous, fibrous polymeric non-woven liner, wherein the work-to-break of the gypsum board in the machine direction of the non-woven liner at a strain of 0.75 inches is greater than 30 lb-inch and in cross direction of the non-woven liners is greater than 10 lb-inch at the same strain of 0.75 inches is disclosed. The '182 patent application discloses a gypsum board having improved flexibility, toughness, abuse resistance, water resistance and fire resistance. The core of the gypsum board is held between two liners of porous fibrous polymeric non-woven mats. The mats do not comprise non-woven glass fibers and are not placed within the gypsum board core.

Foreign Patent JP 2002070239 to Seki discloses a gypsum building material suitable for bearing wall construction. The object of the '239 patent is to provide a surface material utilized in gypsum building materials, such as in the construction of bearing walls, in order to obtain improved interior strength while avoiding the generation of harmful volatile substances. Furthermore, the objects of the invention also include maintaining the excellent performances required for the gypsum building material such as fireproof performance, workability, dimensional stability, economical efficiency, habitability and the like. The gypsum building material is suitable for a bearing wall in which a core material having a plate-like body is blended with gypsum as a main material. The core material is comprised of glass fiber and starch in order to form the gypsum building material. The '239 patent discloses a gypsum building material suitable for a bearing wall. The glass fiber and starch are blended with the gypsum. There is no disclosure that a non-woven glass fiber mat is incorporated within the gypsum board for reinforcement strength.

Foreign Patent WO 03054319 to Blanpied discloses a method and composition for coating a mat and articles produced therewith. The disclosed coated glass mat comprises a glass mat substrate having non-woven glass fibers and a coating which, essentially, uniformly penetrates the glass mat substrate to a desired fractional thickness of the coated glass mat. The coating imparts an increased tensile strength to the coated glass mat, which on average is at least 1.33 times greater than the tensile strength of the glass mat substrate without the coating as shown in the example embodiments. Penetration of the coating into the glass mat substrate preferably extends to a depth of from twenty five percent of the thickness of the coated glass mat to seventy five percent of the thickness of the coated glass mat. Moreover, a non-coated thickness of the coated glass mat is sufficiently thick for bonding purposes with a gypsum slurry or other core materials such as thermoplastic or thermosetting plastics. The coating has a porosity in a range of from 1.3 CFM to 5.0 CFM, e.g., the coating comprises a coating blend which provides the coated glass mat with porosity sufficient to allow water vapor to escape from the gypsum slurry when heated. The coating is preferably a coating blend comprised of water, latex binder, inorganic pigment, and inorganic binder. The adhesive used to bind the glass fibers in the mat is not water-soluble and the glass fiber mat is not placed within the gypsum board. The surface of the gypsum board is the mat with polymeric binder which is rough and cannot be easily painted or wall papered.

There remains a need in the art for enhanced strength gypsum boards with non-woven fiber reinforcement mats with pre-selected fiber architecture that are placed at precise locations providing intimate contact between the gypsum matrix and the reinforcing glass fiber in the non-woven glass fiber mat. The use of any adhesive in bonding the non-woven glass fiber mat prevents intimate contact between the gypsum matrix and the reinforcing fiber thereby compromising load transfer capability from the gypsum matrix to the reinforcing fiber. An improved system is needed that maintains the precise pre-selected non-woven glass fiber mat architecture during placement within a cast gypsum slurry and yet provides intimate contact between the gypsum matrix and the reinforcing glass fiber.

SUMMARY OF THE INVENTION

The present invention provides a gypsum board having a top surface and a bottom surface with facer sheets, preferably of Kraft paper. Glass fibers are provided with a sizing coating for creating a bond between the fiber and a gypsum matrix in a gypsum board. This sizing composition is typically silane based and may comprise polymethylsiloxane that is cured at 100-150° C. The sized glass fibers are laid by an air laying or water laying process to form a non-woven glass fiber mat with pre-selected fiber architecture. The individual fibers that form the non-woven glass fiber mat are initially bonded with a dissolvable or reversible binder so that the fiber architecture in the non-woven glass fiber mat is preserved during handling of the non-woven glass fiber mat such as when using machinery for insertion of the non-woven glass fiber mat into the cast wet gypsum slurry during the manufacture of a gypsum board. The binder either dissolves in the wet gypsum slurry after the insertion and placement of the non-woven glass fiber mat or hydrolyzes and decomposes during the gypsum board drying cycle, thereby allowing intimate contact between the sizing coating on the glass fibers and the gypsum matrix. The creation of this bond anchors the non-woven glass fiber mat with sizing coating within the gypsum matrix thereby transferring the load between the gypsum matrix to the non-woven glass fiber mat reinforcement providing a gypsum board with enhanced strength, flexure resistance and nail pull out resistance.

The gypsum matrix of the present gypsum board is provided from an aqueous gypsum slurry that is preferably made by mixing at least one member selected from the group consisting of calcium sulphate heinihydrate (CaSO4.1/2H2O), calcium sulphate anhydrite (CaSO4), hydraulic setting cement and water.

The process of manufacture of these glass fiber mat reinforced gypsum boards requires minimal changes to the standard gypsum board manufacturing process. The key features associated with the use of a non-woven glass mat having a dissolvable binder system for producing fiber-reinforced gypsum board include, in combination, the means set forth below:

1. coating means for providing a silane based sizing composition on glass fibers;
2. assembly means for laying a non-woven glass fiber mat having pre-selected fiber architecture of sizing coated glass fibers using air laying or water laying methods;
3. bonding means adhesively bonding sizing coated glass fibers in a non-woven glass fiber mat with a dissolvable or reversible binder that decomposes during the curing cycle of a gypsum board;
4. handling means for protecting the non-woven glass fiber mat during the manufacturing process of said gypsum board avoiding excessive breakage of glass fibers within the non-woven glass fiber mat, caused by the resilient nature of the fiber to fiber bond imparted by the dissolvable or reversible binder;
5. delivery and placement means for locating one or more non-woven glass fiber mats having a three dimensional fiber architecture within a slurry of a gypsum board at precise pre-selected locations during its manufacturing process;
6. intimate bonding means for attaching glass fibers in a non-woven glass fiber mat to the cured gypsum matrix, thereby effecting the complete removal of the binders used for initial bonding of glass fibers in the non-woven glass fiber mat and preserving the initial three dimensional architecture of the mat within the gypsum matrix; and
7. surface coating means for bonding conventional paper to both surfaces of the gypsum board.

BRIEF DESCRIPTION OF THE DRAWING

The invention will be more fully understood and further advantages will become apparent when reference is had to the following detailed description of the preferred embodiments of the invention and the accompanying drawing, in which.

DETAILED DESCRIPTION OF THE INVENTION

Figure 1:
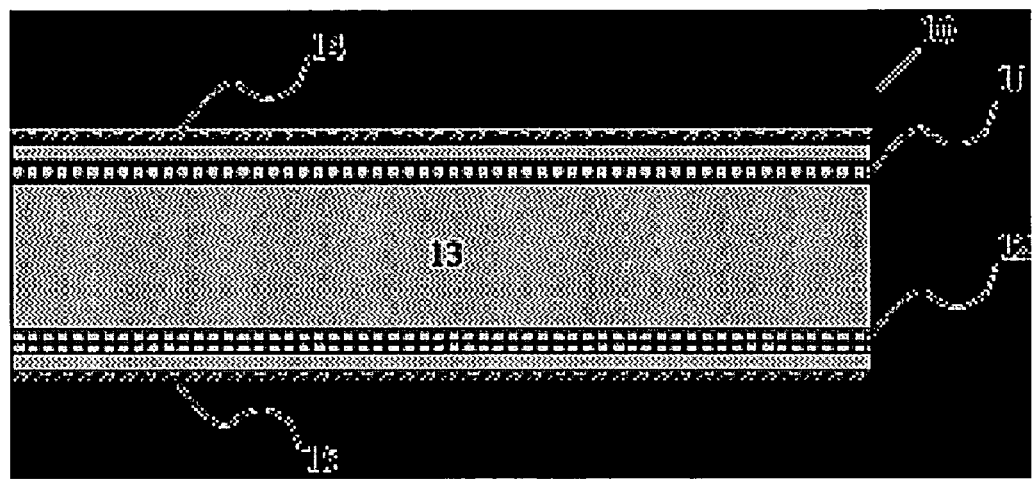
FIG. 1 is a diagrammatic representation of two layers of a non-woven glass mat with a dissolvable binder system for producing a fiber-reinforced gypsum board with paper covering the top and bottom surfaces, the two layers being glass mats incorporated near the top and bottom surface to provide flexural rigidity for the gypsum board.

Gypsum boards incorporate glass fibers to provide fire resistance. When a gypsum board is exposed to temperatures greater than 176° F., the water of hydration in the gypsum matrix is lost and the gypsum matrix crumbles. The presence of glass fibers in the gypsum matrix tends to hold the gypsum matrix together in the event of a fire. The glass fibers found in the prior art are not in any way bonded to the gypsum matrix and do not impart any flexural resistance or strength to gypsum boards.

If glass fibers are coated with an appropriate sizing, however, a bond can be established between the reinforcing glass fibers and the gypsum matrix as detailed in my co-pending applications pertaining to silane based sizing, U.S. patent application Ser. No. 10/796,950 entitled "Silane Based Coatings On Glass Fiber Reinforcements In Gypsum Board," filed Mar. 10, 2004, and nano or micro particle bonded glass fibers, U.S. patent application Ser. No. 10/796,951 entitled "Glass Fibers And Mats Waving Improved Surface Structures In Gypsum Boards", filed Mar. 10, 2004, now U.S. Pat. No. 7,238,402; the disclosure of each of these applications is hereby incorporated in its entirety by reference thereto. The sizing coating may comprise polymethylsiloxane which is cured at 100-150° C. When fibers are incorporated within a gypsum matrix, it is important that the placement and geometry of the fibers is well designed for optimal load transfer. It is also important to preserve the designed fiber architecture during the mat handling process of a non-woven glass mat during its insertion into the cast wet gypsum slurry. The bonding of the fibers within the non-woven glass fiber mat is achieved through the use of a dissolvable or reversible binder which provides for a rigid glass fiber mat that can be readily handled by glass fiber mat insertion machinery. Contact between the sized bondable glass fibers and the gypsum matrix is established when the dissolvable or reversible binder is removed by the aqueous gypsum slurry or reversed during beating of the cast gypsum slurry during the gypsum board drying process.

The present invention relates to a non-woven glass mat having a dissolvable or reversible binder system for fiber-reinforced gypsum board. In particular, the non-woven glass fiber mat is fixed at a pre-selected fiber architecture for use in a gypsum matrix with the use of binders that preserve the structure and geometry of the glass fibers within the non-woven glass fiber mat. The non-woven glass fiber mat can then be readily handled by machinery which will place the mat or mats at a desired location within the cast gypsum slurry, but once it is placed in the water based gypsum slurry, the bonding agent will dissolve, thereby permitting intimate contact between the reinforcing fiber in the glass fiber mat and the gypsum matrix after the curing process.

Generally stated, the non-woven glass fiber mat is manufactured with a binder system that is dissolvable or reversible once it is added to the gypsum drywall slurry during the manufacture of the gypsum board. The glass fibers are laid to form a non-woven mat and are sprayed by a dissolvable or reversible binder that is later dried, resulting in a non-woven glass fiber mat held together by the dried binder. The non-woven mat derived from this method is quite flexible and can be bent without fracturing the glass fibers. Therefore, it can be spooled and fed through a feeding station to incorporate the non-woven glass fiber mat into a gypsum slurry, which is poured over a belt. The exact location of where one or more of these non-woven glass fibers are to be placed within the gypsum slurry is determined by the location of the non-woven glass fiber mat feeding stations. The non-woven glass fiber mat may be fed close to the top and/ or bottom surface of the gypsum board without reaching the outer surface of the gypsum board, which is cast against a paper sheet. Thus the gypsum board contains two paper sheets, one on each of its top and bottom surfaces, respectively.

The non-woven glass fiber mat is produced by either air laying or by water laying of chopped selected lengths of glass fibers. The glass fibers may be provided with a kink so that they do not lie flat. This provides a loosely packed collection of non-woven fibers which may be compressed to provide the required density of the non-woven fiber mat. The kinks in the fibers provide loops of glass fibers in the glass fiber mat that provide structural reinforcement over a large area. The geometry of the non-woven glass fiber mat is fixed by the use of either a dissolvable or a reversible binder that is sprayed directly on the mat and is then hardened or cured to create a bond. Depending on the type of binder used, the curing or hardening process may involve air drying or heating the mat to a specific temperature. Typical binders include casein-based glue (commercially sold as Elmer's glue), starch, polyvinyl alcohol and the like. These binders impart strength to the glass fiber mat further providing integrity of the mat during handling without altering the structure and geometry of the glass fibers within the glass fiber mat.

Advantageously, the non-woven glass fiber mats maintain their original geometry, which is comprised of three dimensional tangled glass fiber networks, when they are incorporated within the gypsum board at precise locations. The original non-woven glass mat binders are completely absent in the gypsum board end product as they are either dissolved or reversed, through exposure to the water-gypsum mixture or through decomposition during curing of the gypsum board, respectively. As a result, the sizing coated glass fibers in the non-woven mat make intimate contact with the gypsum matrix, taking advantage of the three dimensional layout of the original mat structure. The sizing coated glass fibers originating from the glass mat provide reinforcing properties to the gypsum board. Specifically, the reinforcement properties provided to the gypsum board include enhanced flexural strength as well as superior nail pull out resistance. Due to the higher achievable reinforcement strength, the gypsum board may be made thinner as compared to the gypsum boards found in the prior art that have similar strength. A reduced weight gypsum board is produced, which provides superior handling capability and withstands damage to the gypsum board during use.

This process of manufacture of gypsum board with one or more layers of non-woven glass mats which are entirely contained within the gypsum core at precisely selected locations with paper external surfaces, provides a gypsum board with (i) high flexural strength; (ii) excellent nail pull out resistance; and (iii) conventional paper surfaces for easy painting and wall papering of the gypsum board. By way of contrast, gypsum boards reinforced by placing and bonding fiber mats to the surfaces of the gypsum boards result in a gypsum board surface that is very difficult to paint and which does not have a smooth surface finish.

The non-woven glass mat with dissolvable or reversible binder system can be fed to a gypsum slurry or similar slurries used in drywall manufacturing. The binder system reverses or dissolves in the time period between the feeding of the non-woven glass mat to the slurry and the time that the drywall is applied by the end-user. The resulting wallboard product contains primarily, but not exclusively, a randomly oriented fiber blanket dispersed in the core. Glass fibers originating from the glass mat provide reinforcing properties to the gypsum wallboard, and more precisely increases its flexural strength and nail pull-through values. The fibers additionally reduce the weight of the wallboard by replacing some of the gypsum, while maintaining acceptable mechanical properties in the final board.

The glass fiber contained by the non-woven glass mat is compatible with the gypsum slurry or with similar slurries used in the manufacture of drywall. Glass fiber length ranges from 0.5 inch to 3 inches. The diameter of the glass fiber typically ranges from 1 micron to 30 microns. The glass mat has a weight ranging from 0.5 lb/square ft. to 5.0 lb/square ft. The non-woven glass mat is produced through a wet laid process. Examples of dissolvable binder systems are (i) starch based systems; and (ii) polyvinyl alcohol based systems. Examples of reversible binder systems are polymer systems that are subject to hydrolysis at temperatures close to the drying temperatures of gypsum wallboard.

Referring to FIG. 1, the non-woven glass mat with dissolvable binder system for fiber-reinforced gypsum board is shown generally at 10. The non-woven glass mat with dissolvable binder system for fiber-reinforced gypsum board carries non-woven glass fiber mats at locations 11 and 12, which are displaced from the center of the board, thereby imparting flexural strength to the gypsum board. The gypsum board 13 has paper surfaces at 14 and 15, the top and bottom surfaces, respectively, of the gypsum board 13 providing an appearance similar to a common garden variety gypsum board. This reinforced gypsum board can thus be painted or wall-papered in a manner similar to a conventional gypsum board. Gypsum boards that use glass fibers on the top and bottom surfaces instead of paper have been known to have problems in the areas of paint finishing and wall paper adhesion. The gypsum board of the construction discussed herein does not have any of these problems, yet provides superior flexural strength and nail pull out resistance. The gypsum board of the present invention is readily manufactured in commercial gypsum board machinery with minimal modifications to the process since it is not necessary to mix the fibers into the gypsum slurry.

The key features associated with the use of a non-woven glass mat having a dissolvable binder system for producing fiber-reinforced gypsum board include, in combination, the means set forth below:

1. coating means for providing a silane based sizing composition on glass fibers;
2. assembly means for laying a non-woven glass fiber mat having pre-selected fiber architecture of sizing coated glass fibers using air laying or water laying methods;
3. bonding means adhesively bonding sizing coated glass fibers in a non-woven glass fiber mat with a dissolvable or reversible binder that decomposes during the curing cycle of a gypsum board;
4. handling means for protecting the non-woven glass fiber mat during the manufacturing process of said gypsum board avoiding excessive breakage of glass fibers within the non-woven glass fiber mat, caused by the resilient nature of the fiber to fiber bond imparted by the dissolvable or reversible binder;
5. delivery and placement means for locating one or more non-woven glass fiber mats having a three dimensional fiber architecture within a slurry of a gypsum board at precise pre-selected locations during its manufacturing process;
6. intimate bonding means for attaching glass fibers in a non-woven glass fiber mat to the cured gypsum matrix, thereby effecting the complete removal of the binders used for initial bonding of glass fibers in the non-woven glass fiber mat and preserving the initial three dimensional architecture of the mat within the gypsum matrix; and
7. surface coating means for bonding conventional paper to both surfaces of the gypsum board.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A gypsum board, comprising:
   a. a gypsum matrix provided from an aqueous gypsum slurry and having a bottom and a top, a centerline, and external surfaces;
   b. a first facer sheet placed on said bottom of said gypsum matrix;
   c. a second facer sheet placed on said top of said gypsum matrix;
   d. one or more sizing coated non-woven glass fiber mats placed at preselected locations within said gypsum matrix; and
   e. said sizing coated non-woven glass fiber mats bonded by a dissolvable or reversible binder that secure said glass fiber mats in a preselected fiber architecture during handling of said glass fiber mats,
   whereby said dissolvable or reversible binder dissolves in said aqueous gypsum slurry or reverses during gypsum board drying thereby creating intimate contact between sizing coated glass fibers in said non-woven glass fiber mat and said gypsum matrix providing reinforcement to said gypsum board.

2. A gypsum board as recited by claim 1, wherein each of said first and said second facer sheets comprises Kraft paper.

3. A gypsum board as recited by claim 1, wherein said aqueous gypsum slurry is made by mixing at least one member selected from the group consisting of calcium sulphate hemihydrate (CaSO4.1/2H2O), calcium sulphate anhydrite (CaSO4), hydraulic setting cement and water.

4. A gypsum board as recited by claim 1 wherein said sizing coating on glass fibers is silane based.

5. A gypsum board as recited by claim 1 wherein said sizing coating on glass fibers comprises polymethylsiloxane which is cured at 100-150° C.

6. A gypsum board as recited by claim 1 wherein said dissolvable or reversible binder comprises starch.

7. A gypsum board as recited by claim 1 wherein said dissolvable or reversible binder comprises casein glue.

8. A gypsum board as recited by claim 1 wherein said dissolvable or reversible binder comprises polyvinyl alcohol.

9. A gypsum board as recited by claim 1 wherein said non-woven glass fiber mat has a density ranging from 0.5 lb/100 square feet (square is 100 square foot) to 5.0 lb/100 square feet.

10. A gypsum board as recited by claim 1 wherein said non-woven fiber mats are placed away from said centerline of said gypsum matrix and do not touch said external surfaces of said gypsum matrix having on said top and said bottom a first facer and a second facer, respectively.

* * * * *